Sept. 27, 1949.  O. R. BONINGER  2,483,178
CATALYST VESSEL
Filed July 29, 1946  2 Sheets-Sheet 1

INVENTOR.
OTTO R. BONINGER
BY
ATTORNEYS

Patented Sept. 27, 1949

2,483,178

UNITED STATES PATENT OFFICE 2,483,178

CATALYST VESSEL

Otto R. Boninger, Phillips, Tex., assignor to Phillips Petroleum Company, a corporation of Delaware Application July 29, 1946, Serial No. 686,961

6 Claims. (Cl. 23—288)

This invention relates to chemical treating vessels. In one of its more specific aspects it relates to vessels adapted to contain solid reagent material for the promotion of better and more efficient contacting of fluids with solids. In a still more specific aspect it relates to a means for supporting a catalyst within a containing vessel adapted for the contacting of fluids with a solid catalytic material.

The apparatus of my invention finds utility in a catalyst chamber assembly in hydrocarbon conversion reactions, in clay treating of hydrocarbons and in many other applications wherein a fluid is contacted with a solid reagent.

An object of my invention is to provide a treating vessel assembly adapted for the promotion of improved contacting of fluids with solid material.

Another object of my invention is to provide an improved treating vessel assembly adapted for contacting a downflowing fluid with a stationary bed of solid reagent material at high temperatures.

Still another object of my invention is to provide an improved catalyst bed support for use in catalytic conversion vessels wherein high temperature conversions take place and the bed support adapted to absorb expansion and contraction due to the required excessively great temperature changes.

Yet another object of my invention is to provide a catalyst bed support assembly for use in high temperature catalytic conversion chambers wherein the assembly contains no easily plugged separating screen, and further, is adapted to absorb expansion and contraction of associated parts due to thermal changes.

Still other objects and advantages of my invention will be apparent to those skilled in the art from a careful study of the following description and the attached drawing which respectively describes and illustrates a preferred form of my apparatus.

In the drawing, Figure 1 is a cross sectional view, in part, of a catalyst chamber containing one form of my catalyst support, taken on the line 1—1 of Figure 2.

Figures 1, 2:
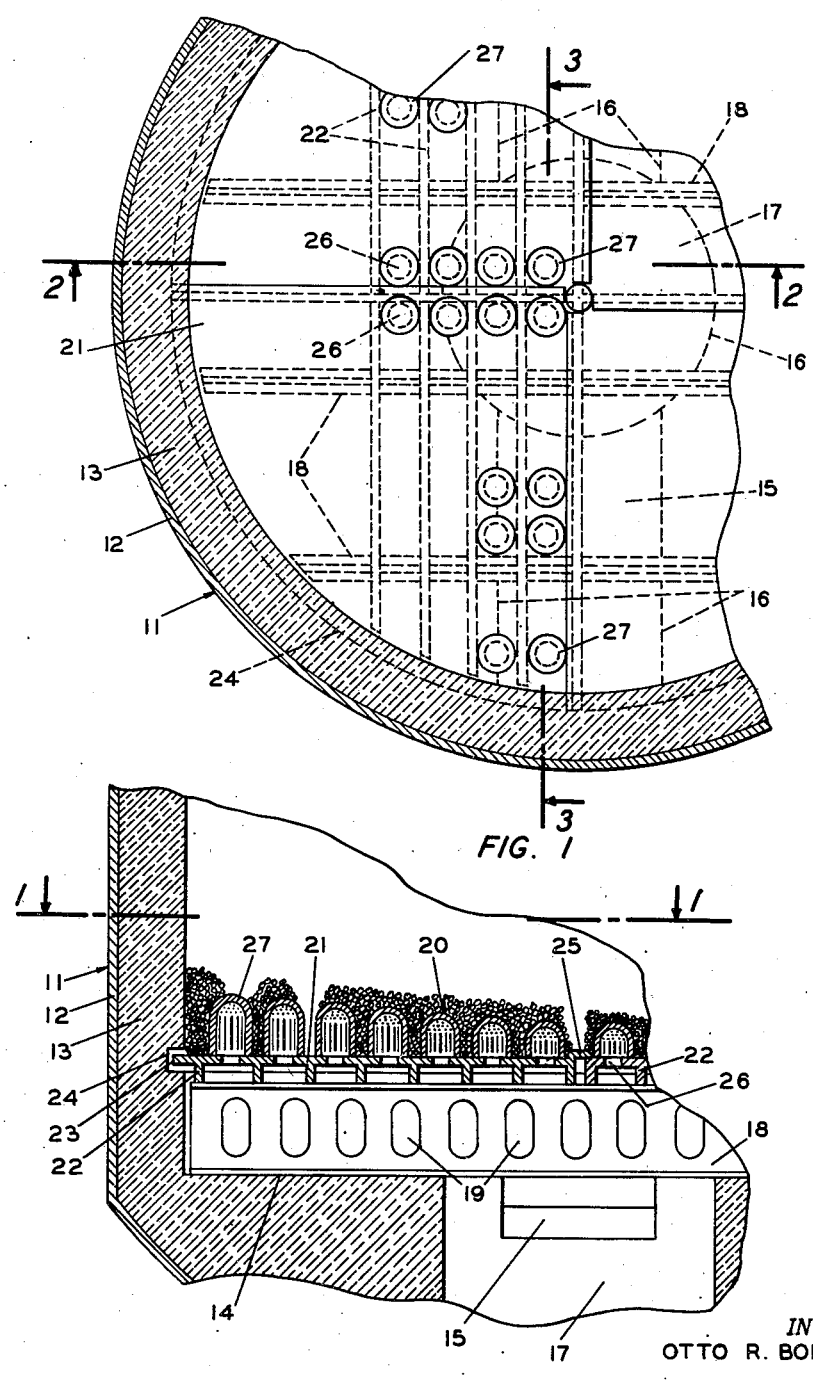
Figure 2 is an elevational cross section of catalyst chamber containing my catalyst support, taken on the line 2—2 of Figure 1.
Figure 3:
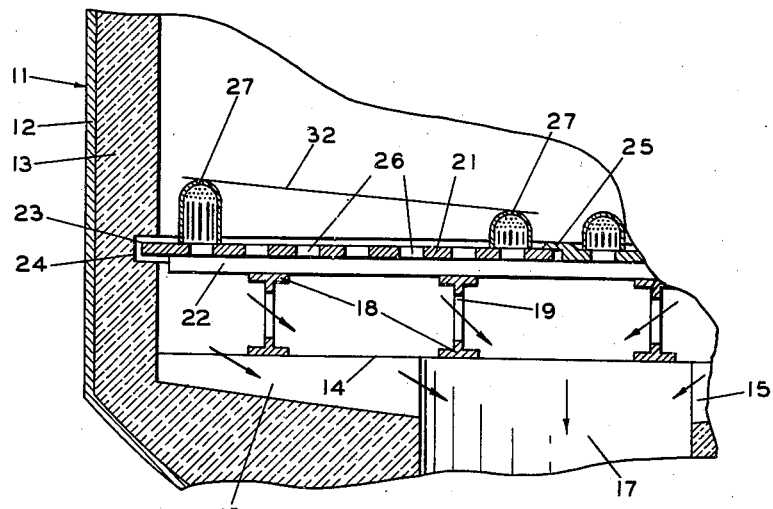
Figure 3 is an elevational cross section, of the catalyst chamber assembly taken on the line 3—3 of Figure 1, and at right angles to the elevational view of Figure 2.

Referring now to the drawing, and specifically to Figures 1, 2 and 3, a catalyst chamber 11 is composed of a steel shell 12 containing a refractory lining material 13. In the base of the chamber this refractory material may be cut away to form a relatively smooth horizontal surface 14. This horizontal surface is broken by a channel 15. This channel 15 is shown in cross section in Figure 3 and in end view of Figure 2. In Figure 1, the broken lines 16 define the side walls of this channel, which has a bottom sloping in such a manner that at the point of discharge of the channel into a discharge outlet 17 of the chamber, the channel has a maximum cross sectional area.

Sitting upon the horizontal surface 14 of the base insulation are several I-beams 18 which are disposed in a direction substantially at right angles to the longitudinal axis of the channel 15. As illustrated in Figures 1 and 3 there are intended to be four such cross I-beams, however, the particular number is immaterial and depends for the most part on the size or diameter of a catalyst vessel.

Mounted upon the I-beams 18 are some ribbed grating plates 21, with the ribs 22 resting directly upon the upper flanges of I-beams 18, and substantially at right angles thereto. The outer edge 23 of the grating plate is fitted loosely into a slot 24 in the side wall insulation for expansion purposes.

In chambers of medium to small size these grating plates may be fabricated in quadrants, which fabrication makes for easy installation and removal when necessary.

In larger chambers, that is of greater diameter, these ribbed plates may be made in squares, or rectangles, and fitted into place but the outer row of plate sections must, of course, have one circular arc shaped side, so that when all sections are in place, a circular bed plate and catalyst support will result.

In the medium and small diameter chambers, as mentioned above, wherein the grating plates may be built in quadrant form, corresponding edges of each quadrant may be made to have a lip 25, see Figures 2 and 3, which extends over the adjacent edge of the adjoining plate. In this manner, a tight and yet thermally expansive joint is formed. By making the expansion slot 24 in the side wall insulation and the lip joints 25 sufficiently large, any reasonable amount of expansion or contraction due to thermal causes, may be absorbed and yet maintain a tight and intact catalyst supporting assembly.

Figure 6:
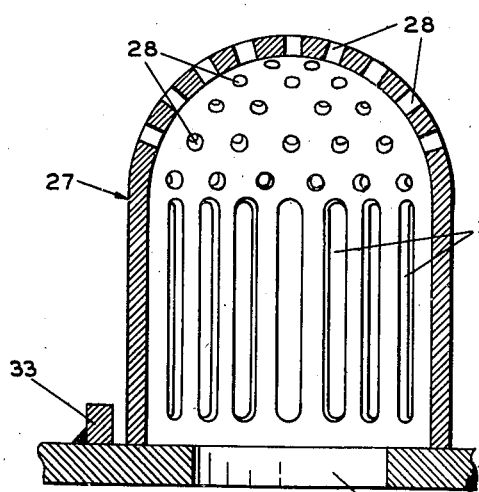
Figure 6 is a cross sectional elevation of a perforated cap taken on the line 6—6 of Figure 7, showing positioning lugs and a section of a grating plate.
Figure 7:
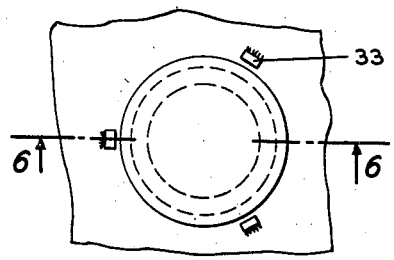
Figure 7 is a plan view of a perforated cap showing positioning lugs and a section of a grating plate.

The grating plates 21 are perforated or rather are made having holes 26 at spaced intervals as illustrated in Figures 1, 2 and 3, and in Figure 6. Over these holes 26 are positioned some perforated caps 27. A cap is shown in detail in Figure 6 in which some top perforations 28 and sidewall slots 31 are illustrated. In one embodiment these top cap perforations are ⅛ inch diameter round holes and the side slots are ¼ inch across or wide and their length may be dependent upon the height of the caps.

The openings 26 in the grating plate were about 3 inches in diameter and of such a number as to permit proper flow of reactant fluid therethrough. Perforated caps covering 3-inch openings may be about 4 inches inside diameter and held in place by lugs 33 described herein below.

In catalyst chamber operation, it is known that vapor velocity is greatest in the central portion of a catalyst bed, and the vapor velocity decreases progressively from the center toward the circumference of bed, or in other words the greater the horizontal distance from the vertical longitudinal axis the greater is the pressure drop through the bed. To overcome this increased pressure, I provide perforated caps having longer side wall slots at points nearer the circumference of the chamber. Thus by progressively increasing the slot area of the caps with the distance of the caps from the center of the chamber, a more nearly uniform pressure drop throughout the cross sectional area of the chamber may be obtained.

This increased slot area may be realized in numerous ways, for example, by making taller or longer caps, or by making caps having greater ratio of openings to surface area, or both. The former method I prefer, since longer caps having long slots are still mechanically strong. Caps having increased perforations and slot area are obviously weakened. Caps having larger diameters might on the surface appear to solve the problem but when using caps of greater diameter a smaller number can be assembled over a given grating plate area, so the overall area of openings free to the passage of reactant or reaction gases is substantially unchanged. I prefer, then, to use longer or taller caps having correspondingly longer side slots at points nearer the chamber side walls. To illustrate this point, lines 32 shown in Figures 2 and 3 are intended to illustrate the progressive arrangement of caps of different heights.

Some lugs 33, may be welded to the grating plate 21 for maintaining the caps 27 in their proper position on the plates. Other means may, of course, be used for fixing the position of the caps, but the use of the lugs 33 is simple and relatively inexpensive. Sufficient clearance should be provided between lugs and caps, so that grating can move freely due to expansion and contraction, whereas caps are held in place by ceramic balls.

A layer of about ½ inch diameter ceramic balls 20 may be placed directly upon the grating and between the perforated caps and sufficient ceramic balls to cover the cap to a depth of 2 to 3 inches. This layer of ceramic ware prevents direct contact of the main bulk of catalyst with the perforated caps and assists materially in preventing or minimizing catalyst leakage through the cap perforations and slots.

The diameter or width of the slots 24 and the diameter of the perforations 28 are as great as possible in order to decrease resistance to fluid flow and yet be consistent with mechanical strength. The slots and perforations, similarly must not be so wide or large as to permit leakage of catalyst.

This point is one of the important advantages of my invention, that is, by the use of the top perforations and side slots in the caps such mechanically weak equipment as bed "screens" are not used. Such screens continuously plug up with catalyst grains, especially at times of cycle change, and plugged screens cause increased pressure drop and ultimately a chamber must be taken off the line and the screen "unplugged" or removed. Screens also get caught between grating sections and become torn, when the latter moves due to temperature changes.

Figure 5:
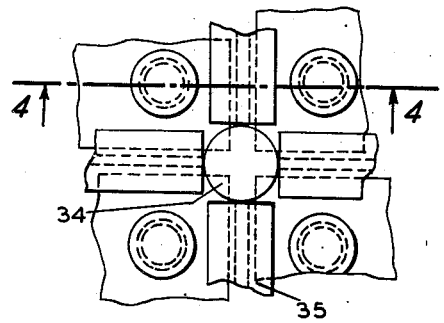
Figure 5 is a plan view of an alternate joint between grating plates.

To seal the central point of the catalyst support structure against catalyst leakage I may use a small diameter circular plate 34, illustrated in Figure 5. This plate may be held loosely in place by four adjacent perforated caps. The point of junction of the right angle corners of the grating quadrants is an opening of variable size. These four grating quadrants can be installed touching one another so as to minimize an opening at their common junction point, but once the chamber is heated and cooled these quadrant points no longer touch one another and an opening of appreciable size may result through which catalyst may sift. With the use of this circular plate 34, expansion and contraction still occur, but the area of opening formed on grating contraction is not localized at one point but is divided among four points, that is at points between the lip 25 of each quadrant plate and the adjacent point of the circumference of the disc of circular plate 34. Thus less catalyst can leak through four small openings than may leak through one large opening.

Figure 4:
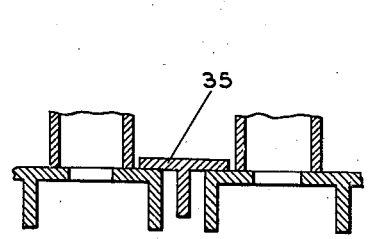
Figure 4 is a sectional view of the alternate joint between grating plates taken on the line 4—4 of Figure 5.

As an alternative to the use of these quadrant plate lips 25, I may use a double slide plate 35, a cross section of which is illustrated in Figure 4. In this embodiment the quadrant plates have no "lips" and the variable area between plates is covered with a sort of long, flat plate member or with a T-type member, the cross bar of course being larger than the vertical bar. This member is held in place by adjacent rows of the perforated caps. With such a T-type member the size or length of the cross bar is such as to make certain that the opening to be covered is covered at all times and that said T-type member does not pass between the quadrant plates.

The vertical height of the ribs 22 on the underside of the grating plates may be of the order of say 2 inches to about 6 inches, this height, however is not critical and may be varied to suit a given set of conditions. The rib size, however, must be sufficient for mechanical strength to support the combined load of the quadrant plates, the perforated caps, and the catalyst under high temperature and high pressure differential operation conditions.

The I-beams 18 may be perforated with relatively large openings 19 for passage of reactant or reaction fluids. These openings may be circular in shape or elliptical, or any other shape desired, the particular shape being obviously immaterial. These openings should not be so large as to decrease the load carrying strength of the I-beams, but, yet should be of a sufficiently large number and of sufficient size to assist in the transfer of fluids from the openings 26 in the grating plates to the channels 15 and outlet opening 17.

In the construction of a catalyst chamber and the assembling of my catalyst support assembly, I first add sufficient insulation to the inside bottom of the vessel, that the top surface of the insulation may be leveled and smoothed sufficiently to serve as a base for the I-beams 18. In addition the sloping cross channels 15 may be molded or cut into this insulation as shown in Figures 1, 2 and 3. These cross channels 15 terminate in the main chamber outlet passage 17. The I-beams 18 are laid at right angles to the common longitudinal axis of the channels 15. The quadrant ribbed grating plates are next inserted with the outer circular edge fitting into the previously cut slot 24 in the side wall insulation. The grating plates are so positioned that the ribs on the underside thereof are substantially at right angles to the I-beams 18. These plates are so positioned with the lips 25 overlapping as described hereinabove. The circular plate 34 is then dropped into place. The perforated caps are then placed so that the shortest caps having the smallest slot area are near the chamber's center, while taller caps are placed nearer the side walls. The lugs 33 have previously been placed so that the installation of the caps merely amounts to dropping them into their proper position. The center circular plate 34 and the double slide plates 35 are dropped into place in case these latter are used in place of the "lip" seal, in both cases the circular plates 34 are placed, wherever four ribbed plates 21 join.

After all the metal parts of the grating supports are placed, ½ inch diameter ceramic balls are first placed on the grating and between the perforated caps. Balls may be placed to a depth of 2 to 3 inches above the caps then granular, pelleted or other form of catalyst may be shoveled or otherwise charged to the vessel directly upon the ceramic balls.

In the operation of a catalyst chamber employing my catalyst support, fluids or particularly gases at conversion temperature may pass downward through the bed of catalyst and leave the catalyst through the plurality of openings, that is, cap perforations and slots, and pass through the multiple openings 26, the space between the ribs 22, through the perforations 19 of the I-beams 18, between the I-beams 18 and through the channels 15 into the outlet conduit 17.

The channels 15 are intended to assist in carrying vapors from some remote points near the periphery of the chamber to the central outlet 17 of the vessel. From Figures 1 and 3 it may be seen that beams 18 are positioned approximately at right angles to the longitudinal axis of the troughs 15. The two centermost beams 18 cross the vessel outlet 17 while the remaining two beams 18 are relatively short and are remote from the outlet 17 and are positioned nearer the shallow ends of the troughs. These troughs are intended to assist especially in prompting flow of reaction vapors from the catalyst support in the areas between these short beams and the adjacent circular sidewalls. Some reaction vapors pass through the beam openings 19 in these short beams but the troughs 15 also carry some reaction vapors from the same region to the outlet 17. By using beam openings 19 and the troughs 15, vapors flow easily and with little pressure drop from the above mentioned grid sections to the outlet 17.

Some reaction vapors passing through the grid assembly at points between each pair of long and short beams 18 also pass to the outlet tube 17 through the troughs 15. In this manner pressure drop of reactant vapors from grid openings 26 to the outlet 17 is reduced over that resulting from use of the beam openings 19 alone.

My catalyst support, likewise, may be used for gas distribution over the cross section of a catalyst chamber in upflow processing.

Several sizes of ceramic pebbles may be used, by first placing a layer of half inch pebbles or balls directly on the grating plate and between the caps, then adding a 2 or 3 inch layer of pebbles of smaller size. Usually it is not necessary to use pebbles smaller than ⅜ to ¼ inch in diameter.

For high temperature service the metal portions of my catalyst support should preferably be made from an alloy steel, such as a high chromium stainless alloy steel. Such a steel maintains its strength in both compression and tension at hydrocarbon conversion and even at combustive regeneration temperatures.

It will be obvious to those skilled in the art that my catalyst support, that is, the grid plates (balls and caps) may be supported on a radial beam assembly, or on a beam assembly composed of several concentric circular beams or other type of beam assembly. In a radial beam assembly, the troughs may not be needed, while in a circular beam assembly, four such troughs as trough 15 may preferably be used.

When my catalyst support is used in such service as catalytic desulfurization which involves more moderate temperatures, the support members may be made of ordinary structural steel.

Any satisfactory type of catalyst vessel shell and insulation therefor, satisfactory for a desired conversion, may be used, since those members form no part of my invention.

It will be obvious to those skilled in the art that many variations and modifications of my catalyst bed support may be made and yet remain within the intended spirit and scope of my invention.

Having disclosed my invention, I claim:

1. A contacting vessel comprising in combination a substantially vertically disposed closed outer shell, said shell having a fluid inlet in its upper end portion and a fluid outlet in its lower end; an insulation lining covering the inner surface of said shell; a plurality of horizontally disposed support beams in the lower portion of the chamber within said lined shell; a grating plate assembly supported on ribs projecting downwardly therefrom to said support beams, said assembly having perforations disposed over its area; and perforate caps covering said perforations in said grating plate assembly, the perforate area of said caps nearer the periphery of said chamber being greater than the perforate area of caps nearer the axis of said chamber.

2. A contacting vessel comprising in combination a substantially vertically disposed closed outer shell, said shell having a fluid inlet in its upper end portion and a fluid outlet in its lower end; an insulation lining covering the inner surface of said shell; a plurality of horizontally disposed parallel support beams in the lower portion of the chamber within said lined shell; a grating plate assembly supported on ribs projecting downwardly therefrom to said support beams, said assembly having perforations disposed over its area; and perforate cap members covering said perforations in said grating plate assembly, said caps having substantially equal horizontal cross-sections but those caps which are closer to the periphery of said chamber being taller and having greater perforate areas than caps nearer the axis of said chamber.

3. The contacting vessel of claim 2, wherein the ratio of perforations in said caps to the surface area of the caps is substantially the same for all cap members.

4. A contacting vessel comprising in combination a substantially vertically disposed closed outer shell, said shell having a fluid inlet in its upper end portion and a fluid outlet in its lower end; an insulation lining covering the inner surface of said shell; a plurality of horizontally disposed parallel support beams in the lower portion of the chamber within said lined shell; a grating plate assembly supported on ribs projecting downwardly therefrom to said support beams, said assembly having perforations disposed over its area; and perforate cap members covering said perforations in said grating plate assembly, said caps being of substantially equal size, those caps which are closer to the periphery of said chamber having a greater ratio of perforations to the surface area of the caps than caps closer to the axis of said chamber.

5. A contacting vessel comprising in combination a substantially vertically disposed closed outer shell, said shell having a fluid inlet in its upper end portion and a fluid outlet centrally disposed in its lower end; an insulation lining covering the inner surface of said shell, said lining forming at least one pair of channels in the bottom of the chamber formed by said lining, which channels extend from the periphery of said chamber to said fluid outlet, each channel pair being in linear alignment; a plurality of horizontally disposed parallel support beams on the bottom of said chamber, said beams being disposed at substantially right angles to a pair of said channels; a grating plate assembly supported on ribs projecting downwardly therefrom to said support beams, said assembly having perforations distributed over its area; perforate cap members covering said perforations in said grating plate assembly, said caps having substantially equal cross-sections but the caps which are closer to the periphery of said chamber being proportionately taller and having proportionately greater perforate areas than caps nearer the axis of said chamber; and lug members rigidly affixed to said grating plate assembly about said caps covering said perforations therein, whereby said cap members are prevented from sliding and are retained in place.

6. The contacting vessel of claim 5, wherein said grating plate assembly comprises quadrants each of the quadrants being provided with a raised extending lip along one of its inner edges and the other inner edge being plain, said quadrants being assembled so that a plain inner edge of one quadrant is fitted in the recess formed by the extending lip of the adjacent quadrant; and said cap members are provided with a plurality of apertures up to ⅛ inch in diameter in their upper ends and with a plurality of slots up to ¼ inch in width and a length proportionate to the length of the sides of said caps in their sides.

OTTO R. BONINGER.

REFERENCES CITED

The following references are of record in the file of this patent:

UNITED STATES PATENTS

| Number | Name | Date |
|--------|------|------|
| 2,399,560 | Murphree | Apr. 30, 1946 |

FOREIGN PATENTS

| Number | Country | Date |
|--------|---------|------|
| 4,406 | Great Britain (1912) | July 25, 1912 |
| 25,336 | Great Britain (1911) | Aug. 8, 1912 |